C. W. BARNABY.
TYPE BAR ACTION.
APPLICATION FILED OCT. 28, 1916.

1,334,012.

Patented Mar. 16, 1920.
4 SHEETS—SHEET 1.

Chas. W. Barnaby
INVENTOR.
BY Knight Bros
his ATTORNEYS.

C. W. BARNABY.
TYPE BAR ACTION.
APPLICATION FILED OCT. 28, 1916.
1,334,012.
Patented Mar. 16, 1920.
4 SHEETS—SHEET 2.
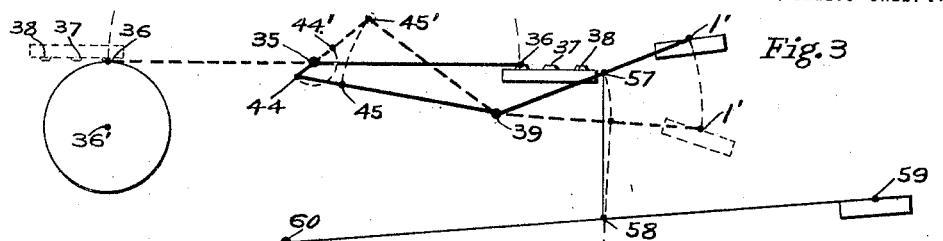
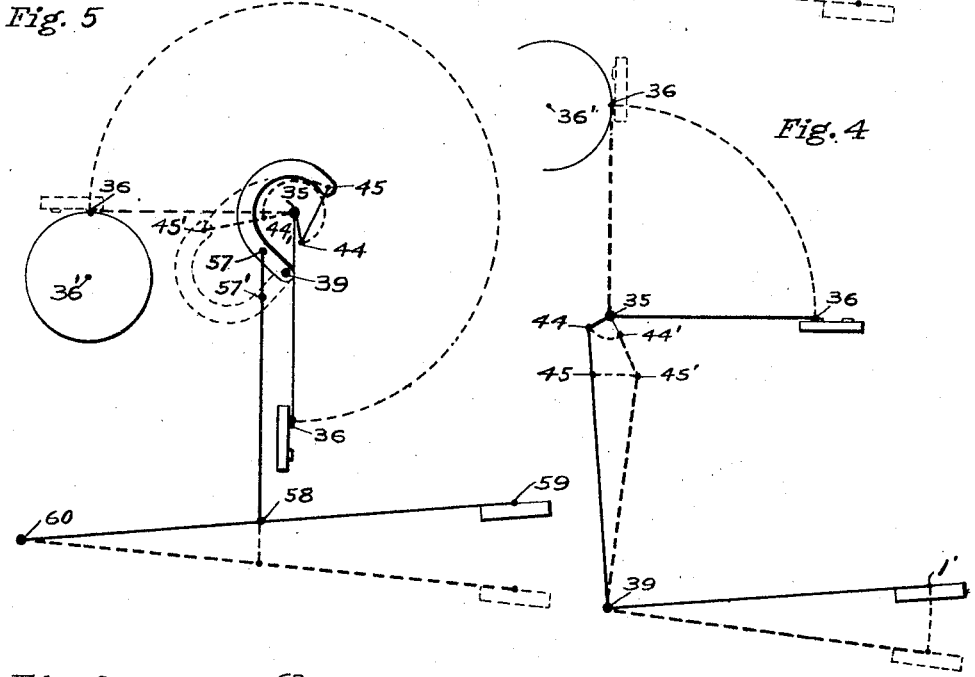
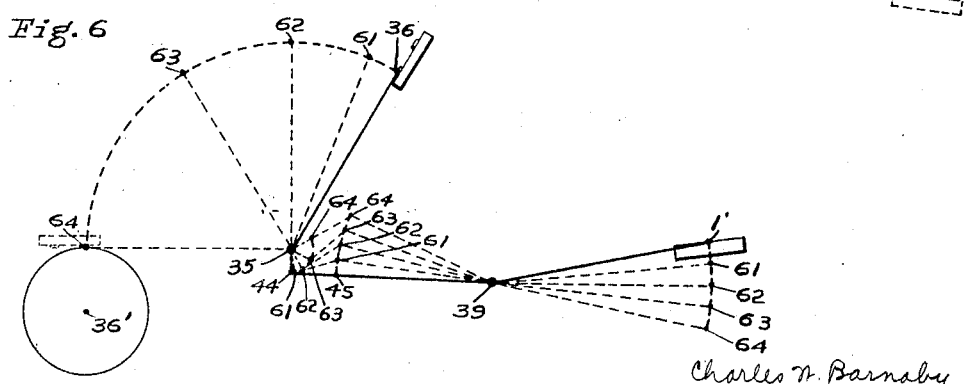
Charles W. Barnaby
INVENTOR.
BY
his ATTORNEYS.

C. W. BARNABY.
TYPE BAR ACTION.
APPLICATION FILED OCT. 28, 1916.

1,334,012.

Patented Mar. 16, 1920.
4 SHEETS—SHEET 3.

Charles W Barnaby
INVENTOR.

BY Knight Bros
his ATTORNEYS

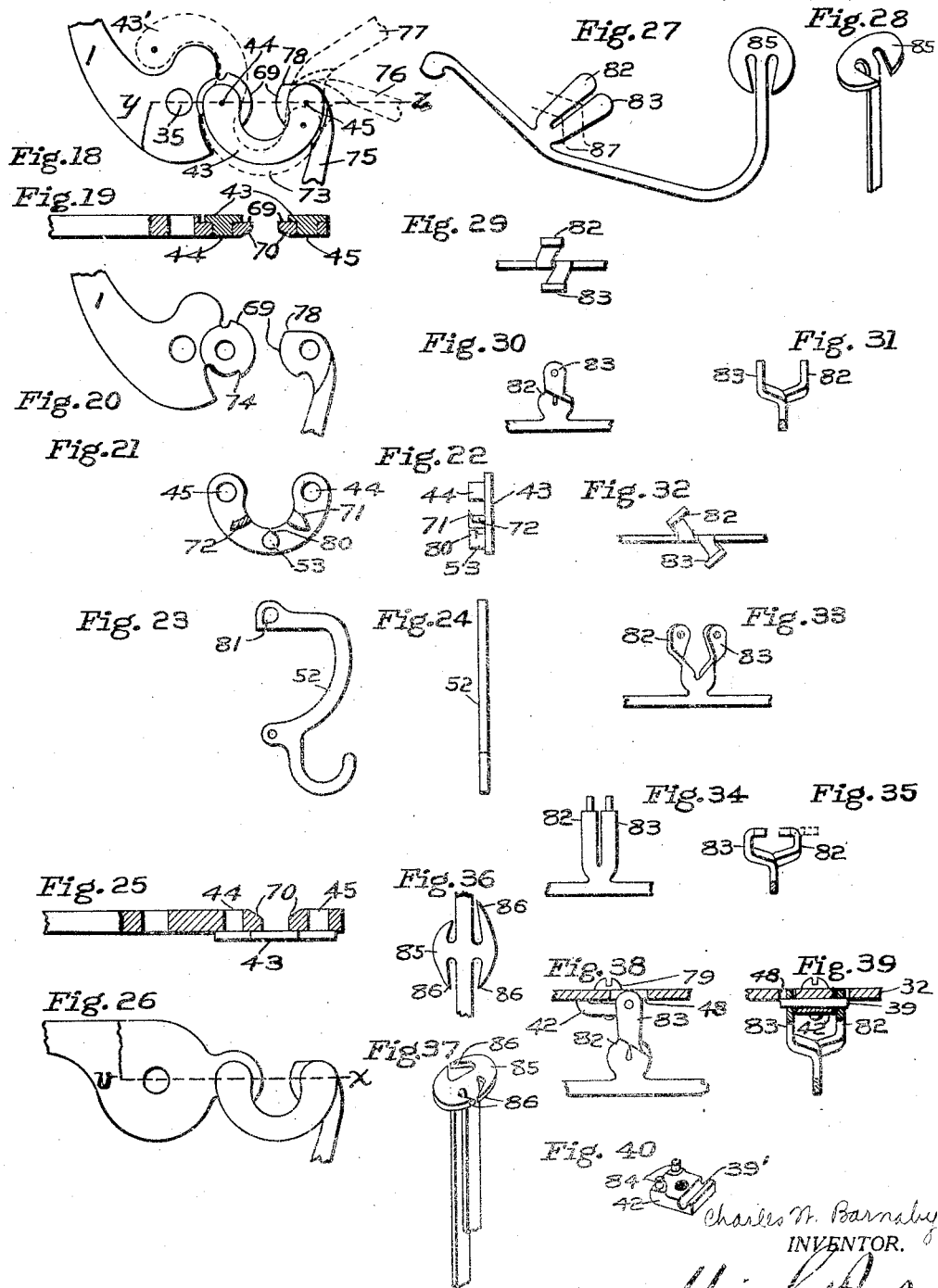

UNITED STATES PATENT OFFICE.

CHARLES W. BARNABY, OF NEW YORK, N. Y.

TYPE-BAR ACTION.

1,334,012.    Specification of Letters Patent.    Patented Mar. 16, 1920.

Application filed October 28, 1916. Serial No. 128,248.

*To all whom it may concern:*

Be it known that I, CHARLES W. BARNABY, a citizen of the United States, and resident of the borough of Richmond, county of Richmond, city and State of New York, have invented certain new and useful Improvements in Type-Bar Actions, of which the following is a specification.

This invention relates to typebar and key-lever mechanism for typewriters and has for its primary object to provide an improved construction, combination and arrangement of parts in mechanism of this character which will be compact in structure, economical to manufacture and efficient in service. One of the objects of this invention is to provide an improved key lever and type-bar mechanism which is normally self-locking which is easy to accelerate and which operates on sound mechanical principles. Another object is to provide an improved arrangement of key levers with respect to the type bars which they operate. Subsidiary objects of invention will appear in the specification and be pointed out in the appended claims, reference being had to the accompanying drawings which exemplify my invention in an adaptation to a standard keyboard typewriter.

The subject matter of this application is disclosed in part in the drawings and the specification of my copending application Serial No. 112,951, filed August 3rd, 1916. The construction of the key levers and method of manufacture of the multiple bearings shown and described herein constitute the subject matters of divisional applications Serial Numbers 273,865 and 273,866, filed January 29th, 1919.

In the drawings:—

Figs. 3, 4, 5 and 6 are diagrammatic elevations of the key and type-bar connections, according to several different embodiments of my invention;

Fig. 18 is a fragmentary side elevation of the type bar and key-lever connections on an enlarged scale;

Fig. 19 is a section on the line $y$—$z$, Fig. 18, looking upward;

Fig. 20 is a view similar to Fig. 18 with the link removed;

Fig. 21 is an elevation of the link from the side opposite to that shown in Fig. 18, one of the lugs being shown in section;

Fig. 22 is an end view of the same;

Fig. 23 is a side elevation of the spring hook detached;

Fig. 24 is an edge view of the same;

Fig. 25 is a section on the line $v$—$w$, Fig. 26, looking downward;

Fig. 26 is a side elevation of a modified form of the link connection shown in Fig. 18;

Fig. 27 is a plan view of a key-lever blank cut from sheet metal;

Fig. 28 is a fragmentary perspective view of the same with the cap-bearing flange bent at right angles to the stem;

Figs. 29, 30 and 31 are fragmentary top, side and end views, respectively, of a key-bar adjacent the bearing lobes;

Figs. 32 and 33 are similar top and side views of a key lever with bearing lobes bent on different lines to arrange the pivot pin at an angle less than ninety degrees to the body of the lever;

Figs. 34 and 35 are fragmentary side and end views of a modification in which the pivot pins are formed on the ends of the lobes;

Fig. 36 is a fragmentary plan view of a sheet metal blank for a double stem key lever, and Fig. 37 is a fragmentary perspective view of same;

Fig. 38 is a fragmentary side elevation of the lever bearing on its pivot pin, parts contiguous thereto being shown in section;

Fig. 39 is a cross section of the same at the pivot pin; and

Fig. 40 is a perspective view of the pivot pin clamp shown in Figs. 38 and 39.

Figure 1:
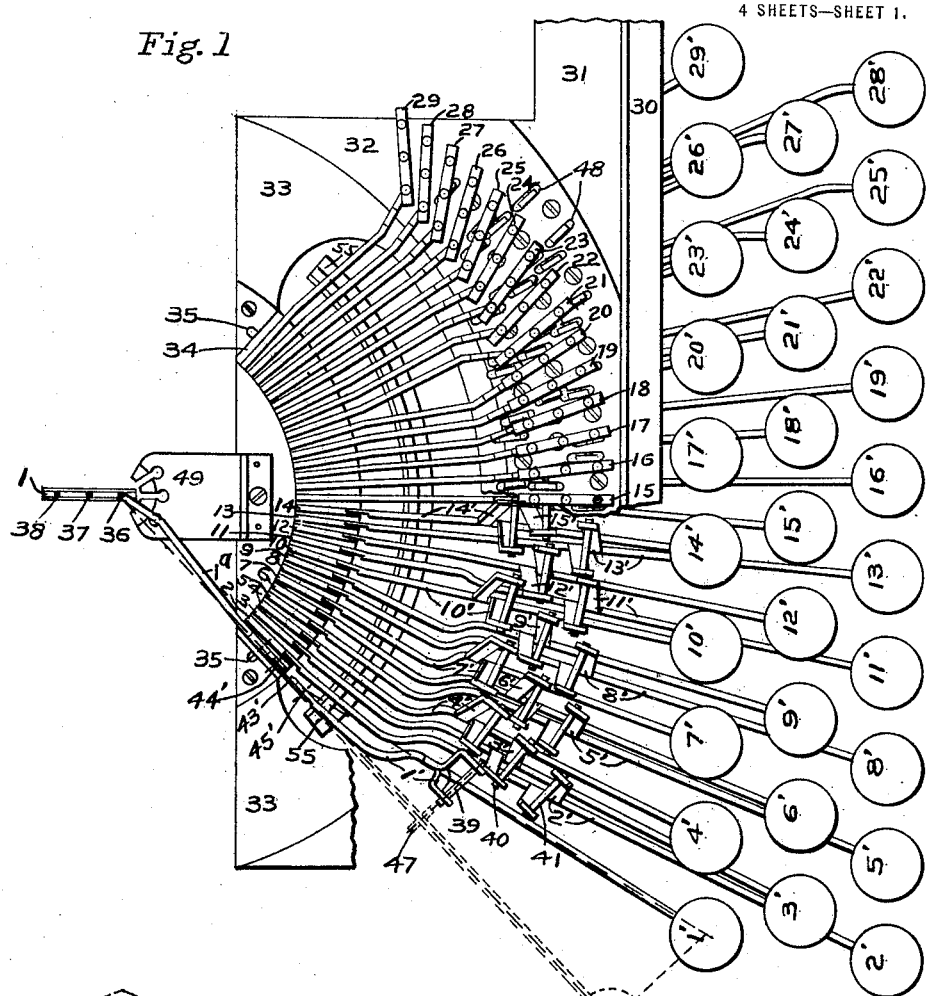
Figure 1 is a top plan view of the key board and type-bar mechanism of a typewriter constructed in accordance with the principles of the present invention, parts being removed to show underlying portions.
Figure 2:
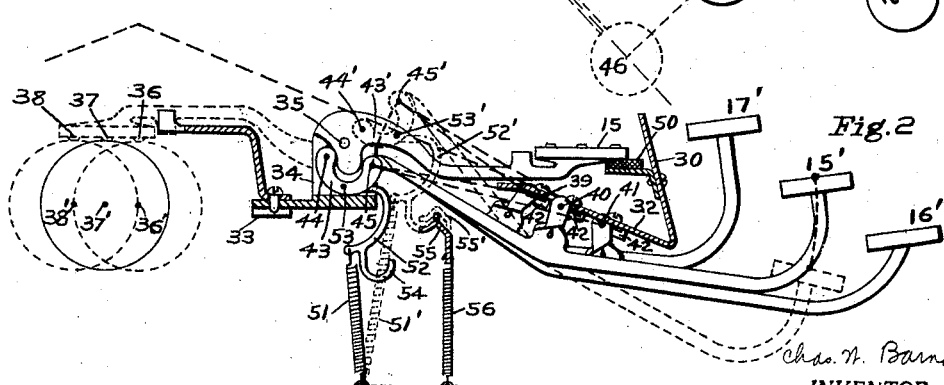
Fig. 2 is a central vertical section of Fig. 1.

Referring to Figs. 1 and 2, a type of bar 1ª has one end disposed in one of the slots of a type-bar bearing block, a plurality of similar type bars having been removed from slots 2 to 14 inclusive in the lower half of Fig. 1 to show the key levers therebelow. In the upper part of Fig. 1 are shown type bars 15 to 29 inclusive at rest. Key levers 2' to 14' inclusive are adapted to be connected up to type bar levers in slots 2 to 14 inclusive, the key lever 1' being connected up to operate type bar 1. Key levers 15' to 29' inclusive are similarly arranged to operate type bars 15 to 29 inclusive. An approximately upright wall 30 separates the key board from the type bars, said wall forming part of a frame which supports the key levers and includes a horizontal platform 31 to the rear of each end of the key board, a conical wall 32 and an upper platform 33 which is somewhat depressed adjacent the bearing block 34. A curved pin 35 which passes through the bearing block 34, serves to pivot the type bars. The bearing block 34 is secured at each end to narrow extensions of the upper platform 33 of said frame. These extensions are preferably depressed sufficiently to bring the top of the bearing block 34 on a level with the upper plane of the top row of keys. The type bars radiate from a point or axis 36 which is also the center of curvature of pin 35 as well as the center from which the bearing slots radiate.

The key-levers are pivoted on three sets of pins 39, 40, 41 arranged in three curved rows, each pin being clamped to the under part of the conical portions 32 of the frame by a clamp block 42, a screw being provided which engages the frame and block. Holes 48 are provided in the frame to give clearance for the lever bearing lugs 82 and 83 to be hereinafter referred to. The upper row of pivot pins 39 are for the key-levers belonging to the upper row of keys 1' to 29'; the second row of pins 40 are for the levers belonging to the middle row of keys 3' to 27'; and the third row of pins 41 are for the key-levers belonging to the lower row of keys 2' to 28'. The apex of the conical surface 32 is approximately on a perpendicular line through 36 and the inclination of the conical part of the frame is such that the pivot pins 39, 40 41 located at various distances from the apex of the cone, will, at whatever points said pivot pins are located, bring the two extreme positions 45, 45' of the connection with the link 43 in the same relation to the type bar pivot 35.

Type bar 1 is shown in striking, or printing position in Fig. 1. The ideal mechanical arrangement of levers would be to have the key for type bar 1 arranged in dotted line position 46 and the key-lever pivot at 47 on the extension of the radial line passing from center 36 through the center of the type bar pivot, the pivots 44', 45' and 47 being arranged along a radial line and parallel with the type bar pivot. Conformation to the standardized keyboard however, requires that the key for type bar 1 shall be at 1' and not at 46. The force which is applied to key 1' is transmitted at the other end of the key lever at 45' to the link 43'. If, therefore, pin 47 is moved in a straight line to the right to 39, and centered longitudinally of the pin, on a straight line from 45' to 1', if pivot pins 44', 45' 39 be arranged parallel to the pivot of type bar 1, the movement will be as mechanically correct as though the key was located at 46 on a straight radial line with type bar 1, the forces acting centrally on the parallelly disposed pivots.

In a like manner, the pivots of each of the other key-levers, together with its link and type bar may be arranged parallel with each other and central to the force applied to them. The key-lever pivots 39, 40, 41 are suitably placed to give each key approximately the same dip as all of the others when its type bar is thrown from normal to striking position. I prefer to employ a multiple guide 49 to accurately control the striking point of the type upon the platen. In the drawings, a triple guide is shown, which engages the body of the bar close to the bar head, bars 1' to 9' falling in the left hand slot, bars 10 to 20 in the middle slot and bars 21 to 29 in the right hand slot.

In the embodiment of my improvement shown in Figs. 1 and 2, the type bars have an angular movement of 180 degrees from normal to striking position. The action here shown is of the type which carries three characters on each bar head, requiring three writing positions for the platen. Referring to Fig. 2, the different members of the action lie in normal position, as indicated by the full lines, the outer end of type bar 15 resting on the stop cushion 50, the short link 43 lies on or near to the bottom of the slot in bearing block 34. The several members are held in normal position by a spring 51 which is connected to spring hook 52, the latter engaging a pivot pin on the link at 53. When key 15' is pressed down to the position shown in dotted outline in Fig. 2, the several parts assume the positions shown in dotted outline, link 43 passing to the position 43' and the type bar passing to its striking position at the platen. As the spring hook approaches the dotted position 52', its hooked arm 54 engages a V groove 55 of the universal bar and carries it upward to dotted line position 55' causing it, through suitable mechanism, to perform the usual feed functions. Spring 56 tends to return the universal bar to its normal position. This tendency is utilized through spring hook, dotted line position 52' to start the type bar back toward its normal position. The direction of its action on pin 44' largely toward the keyboard is more effective in starting the type bar than spring 51' dotted line position which acts principally downward and slightly from the direction of the keyboard. Upon removing the pressure on key 15', the several parts of the action return to their normal positions. The axis of the platen occupies one of the positions 36', 37', 38' according to which of the characters 36, 37, 38 it is desired to impress upon the article being written upon.

Fig. 3 diagrammatically illustrates the mechanics of this action. The solid heavy line 1', 39, 45 represents a continuous rigid key-lever pivoted at 39. The solid line 44, 35, 36 represents the type bar pivoted at 35. The solid line 45 to 44 represents the short link connecting the key-lever to the type bar. These solid lines show the members in normal position. The corresponding dotted lines show these members in striking position. From this description it will be noted that I have a dead center condition in the levers at each extreme of their action. In normal position the two link pivots 44, 45 are in a straight line with the key-lever pivot 39. This locks the type bar against any possibility of the bar being lifted from its normal position through force applied to the bar itself, as any force applied at 36 to move it upward will merely act along the line of the pivots 44 and 45 against the pivot 39. As employed in the claims, the expression "substantially in the same plane", used in connection with the axis of the oscillating lever and the pivotal axes of the link which connects this lever to the type bar, is to be understood as covering the construction described above or any substantial equivolent of the same such as the modification shown in Fig. 7 as hereinafter described and according to which the normal-at-rest position of pivot 44 is slightly beyond the dead center position with respect to pivots 39 and 45. The type bar is thus effectually locked against rebounding from its cushion to become tangled up with an adjacent bar which has been started on its striking movement.

When, upon pressing key 1' down to dotted line position, the mechanism is put into striking position, a dead center condition again exists, the pivots 45' and 44' being in a straight line with the pivot 35 of the type bar. This mechanism has several important advantages, one of which is that with a lever moving a short distance 45 to 45' through a comparatively small angle about its pivot 39 and connected to a type bar by a single link, said bar may be made to rotate through an unusually wide angle about its pivot 35. Other advantages will be hereinafter referred to. This wide angle action of the type bar is secured by placing the link pivot end of the operating lever comparatively close to the type bar pivot 35 so that the pivot end of the lever in traveling from 45 to 45' will make a considerable angular advance around the type bar pivot in the same direction that the type bar is at the same time moving. It will be noted that the radial position 35—45' which pivot point 45' occupies with respect to pivot 35 is well on to 90 degrees in advance of the radial position 35—45 which it occupied in normal position. At the same time that the outer pivot 45' of the link has been carried almost 90 degrees around the type bar pivot, said link has swung through a considerable angle carrying its other pivot around the type bar pivot from 44 to 44', an angle of 180 degrees and thus carrying the type bar through the same angle from normal to striking position. The mechanism shown in Fig. 3 as thus far described, is similar to that of Figs. 1 and 2, and is suited to a low down, compact machine designed to facilitate its transportation. For a high machine of the regulation office type key 1' may be omitted and that part of its lever 57, 39, 45 utilized as an intermediate lever operated by key 59 on lever 59, 58, 60 pivoted at 60 and connected to the intermediate lever by link 57—58 so that when key 59 is pressed down to the dotted line position, the type bar will be thrown from normal to striking position as before.

While I prefer to use a type bar movement of 180 degrees, my improvement may be used for type bar movements considerably in excess of, or considerably less than 180 degrees. Fig. 5 diagrammatically illustrates my improvement arranged to throw the type bar through an angle of 270 degrees and Fig. 4 illustrates another arrangement of my improvement to give the type bar a movement of only 90 degrees. According to my invention greater or less type bar movements may be obtained by my improvement than is shown in these two figures.

The operation of the embodiment shown in Fig. 4 is the same as that of the embodiment shown in Fig. 3 and requires no further explanation. It illustrates an adaptation of my invention to a single shift high machine.

The embodiment shown in Fig. 5 differs principally from the preceding embodiments, in that pivot 45 is placed beyond pivot 35 instead of on the same side of the latter as pivot 39. The result is that arc 45—45' traversed by the end of the actuating lever curves in the same direction as the arc 44—44' traversed by the actuated arm of the type bar, instead of being curved in reverse directions as in Figs. 3 and 4. With respect to the type bar pivot 35, the radial position 35—45' of pivot 45' is about 157 degrees in advance of the radial position 35—45 of the same pivot when in normal position 45. It is thus seen that while the actuating lever rotates 90 degrees about its own pivot 39, it advances about 157 degrees around pivot 35 of the actuated type bar arm. The actuating arm is connected to the short actuated arm 35—44 by the short link 44—45 and the actuating link pivot 45 in passing 157 degrees around pivot 35 to 45' not only carries link pivot 44 this 157 degrees around pivot 35, but, by swinging the short link, carries it some 113 degrees farther to 44' or three fourths of a circle, the type passing at the same time from normal position 36 through an arc of 270 degrees to the dotted position over the center 36' of the platen. As in the preceding case there is a dead center in the mechanism both at normal and striking position, the link pivots 44—45 being in line with the actuating link pivot 39 in normal position and in line with the type bar pivot at 45'—44' 35 in striking position. The actuating lever is operated by means of the key lever 59—60 to which it is connected by the link 58—57. When the key 59 is pressed down to the dotted position, the connecting pivot is drawn downward from 57 to 57'.

Fig. 6 illustrates the accelerating effects secured by the use of my improvement. Key 1' is indicated as passing through four equal stages 61, 62, 63, 64, the link pivot at the other end of the key lever moving upward from 45 by correspondingly equal stages 61, 62, 63, 64.

During these intervals, the pivot at the other end of the short link advances from 44 by very unequal stages to 61, 62, 63, 64, so that the type face also advances by correspondingly unequal stages from 36 to 61, 62, 63, 64. It will be noted that as the key-lever and short link leave the dead center position 44—45—39, the type bar advances very slowly and that as the levers approach the other dead center position 36—63—64, the type bar advances very rapidly to the striking position 64, the type bar traveling almost as far (63 to 64) during the last quarter movement of the key 1' as it does (36 to 63), for the first three fourths movement of the key. This gradual acceleration of the type bar gives the action a very easy finger touch.

Figs. 3 to 6 illustrate the wide range of applicability of my improvement and various other modifications in the arrangement of the parts and within the scope of my invention will readily manifest themselves to those versed in the art.

Figure 7:
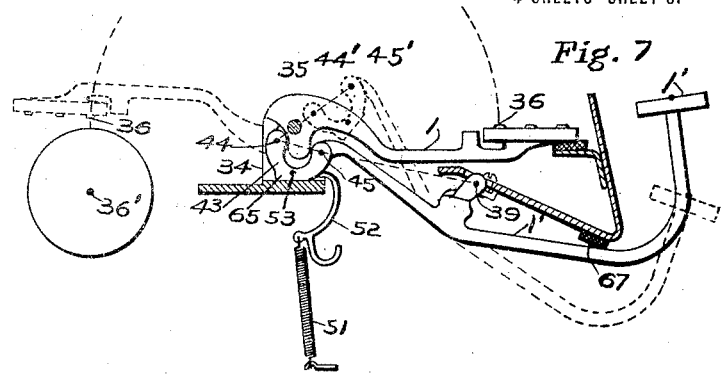
Fig. 7 is a side elevation of a modified form of a single unit of the action shown in Figs. 1, 2.

Referring now to Fig. 7, as an extra precaution against the rebounding of the type bar from its cushion in normal position, I prefer to drop link pivot 45 slightly below the line from 44 to 39 as here shown; also to have pivot centers 35—44'—45' come to a straight line position shortly before the type bar comes in contact with the platen, as also shown in the figure. Thus arranged, it is evident that if the key 1' is pressed slowly down to the dotted position, the type bar cannot be forced any closer to the platen than the position shown by its dotted outline. In order to have the type face come in contact with the platen to make an impression, it is necessary to force the key down with a quick motion, when the momentum of the type bar will carry it past the dead center position, making an impression and rebounding immediately, giving what is known as a "snap blow." I also prefer to provide link 43 with a shoe 65 to give it a firmer seat on the bottom of the type bar slot in the bearing block 34. This shoe coming in contact with the bottom of the slot may form the stop for the link and key-lever in normal position or a stop may be provided elsewhere, as at 67 for the key-lever which may in turn act as a stop for the link, holding it slightly above contact with the bottom of the slot. In either case when pin 35, upon which all of the type bars are pivoted, is withdrawn, spring 51 will hold the shoe of the link against the bottom of the slot and thus maintain the pivot end of the type bar in approximate position, so that pivot pin 35 may be easily inserted. The end of said pin is rounded or coned. The alinement will be more closely and certainly maintained during such times as the pivot pin is removed if the link is provided with a lug 66, Fig. 8, in addition to the shoe 65, a pocket 68 being provided in the bearing block to receive the lug.

Figure 8:
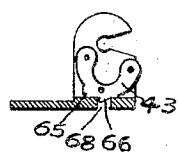
Fig. 8 shows a modification of the link and type bar bearing of Fig. 7.
Figure 11:
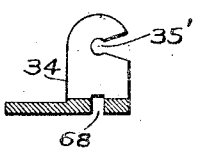
Fig. 11 is a central vertical section of the same.
Figure 9:
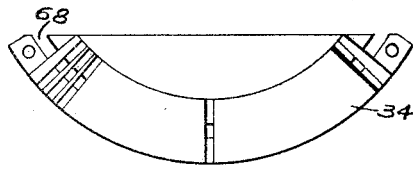
Fig. 9 is a plan view of a bearing block for type bars employed with links such as shown in Fig. 8, only a portion of the bar slots being shown.
Figure 10:
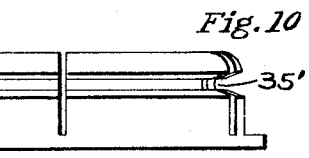
Fig. 10 is a front view of Fig. 9.
Figure 13:
Figure 14:
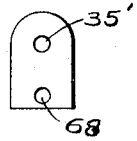

Figs. 9, 10, 11 show a type bar bearing block machined to the proper curvature, but only partially slotted for the type bars. A common form of circular slot 35' is machined for the reception of the pivot pin, but in the application of my improvement, I provide an additional groove or slot 68, to form the pockets for the link lugs 66, Fig. 8.

Figure 12:
Figs. 12, 13 and 14 are top, side and end views of a blank shaped and drilled preparatory to forming a bearing block for type bars.
Figure 16:
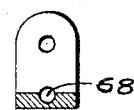
Fig. 16 is a section, through one of the slots, of Fig. 15.
Figure 15:
Fig. 15 is a top plan view of the same after it has been bent to the proper curve and partly slotted.
Figure 17:
Fig. 17 is a detail of the curved pivot pin for mounting the type bars in bearing blocks such as those shown in Figs. 9 and 15.

Figs. 12 to 16 show my improved form of type bearing block provided with a round hole 35' for the reception of the pivot pin instead of the usual slot 35' of Fig. 11. Fig. 12 is a top view, Fig. 13 a side view and Fig. 14 an end view of a straight bar pierced with a straight hole 35' for the reception of the curved pivot pin, Fig. 17. If a lugged link, Fig. 8, is to be used, a straight hole 68 is also drilled through the bar. The bar is then bent to the proper curve, Fig. 15, and slotted for the type-bars—only some of such slots are shown in the figure. Fig. 16 is a section through one of the type bar slots of Fig. 15. This figure shows the lug pockets that are produced if the second hole 68 is provided. Fig. 17 shows a type bar pivot pin suitable for use with the blocks here shown. The ends of the pin are made more or less pointed by rounding or beveling the corners, so that it can more readily be passed through the type bars.

Referring now to Figs. 18, 19, 20, 21, 22, my invention contemplates an improved link and an improved connection between the actuating lever and type-bar. According to this construction, the lateral faces of lever, type-bar and pivots are made flush with each other. These parts have an interlocking engagement which permits the joints to freely enter the type-bar bearing slots and the link pivots of which are maintained in proper engagement with the members to which they are connected. One face of each of the two members connecting with the link is depressed so that the body 43 of the link sets into the depressions sufficiently to bring the outer face of the link flush with the face of the connecting members. The pivot eyes of the connecting members are provided with flanges 69 beveled at 70 concentric with the pivot holes. These beveled edges of flanges 69 hook under the lips 71 of lugs 72 on links and thus retain the pivots in their bearings in the connecting members. Referring to Fig. 18, the working range of movement of the link is from the full line position 43 to the dotted position 43'. Within this range of movement the lip 71 (see Figs. 21 and 22) of the link lug is in engagement with flange 69 of the type bar. If, however, the link is swung past its regular working position to dotted position 73, lip 71 of the lever passes free of corner 74, Fig. 20, of beveled flange 69, thus permitting the removal of the link from its bearing in the type bar. Likewise the working range of movement of the actuating lever is from full line position 75 to dotted position 76, throughout which range of movement lip 71 of the link is in engagement with beveled flange 69. If, however, the actuating lever is swung to the position 77, corner 78 of flange 69 passes free of lip 71 and the link may be removed from its bearing in the actuating lever. The link, Figs. 21, 22 is provided with a spring hook pin 53 having a small lug 80 on its outer end. Hole 81 in the spring hook (see Figs. 23, 24) is notched to pass over lug 80 on to the pin 53, the notch in 81 being so located that the spring hook has to be swung to a position beyond its working range of movement to place the hook on or to take it off of its pin on the lever.

Figs. 25, 26, show the link and its connecting members as arranged when the link does not have to pass into the bearing slot of the type bar. In this case, it is not necessary to let the body of the link 43 into the face of the connecting members, otherwise the connection is as before, lips on lugs on the link engaging the beveled flanges at 70 to maintain the pivots 44, 45 in their bearings in the connecting members.

My improved lever pivot is illustrated in Figs. 27 to 40. Fig. 27 shows my improved key-lever which is made from a blank punched from sheet metal and has two bearing lugs 82, 83 suitably arranged to provide widely separated bearing surfaces to engage a pivot pin at various angles from the body of the lever. By bending lugs 82 and 83 approximately on lines 87, Fig. 27, the lugs take the position shown in Figs. 29, 30, 31, at right angles to the body of the key-lever. By bending the lugs on other lines, the bearing line may be thrown at various other angles with respect to the body of the lever, such for example as in Figs. 32 and 33 where the angle is about 45 degrees. Where it is desirable to have the pivot pin on the lug itself, such a pin may be formed as indicated on lugs 82, 83 (see Fig. 34). This pivot pin may be bent inward as indicated in full lines, Fig. 35, or may hook outwardly as indicated by dotted lines. The assembly of my improved lever pivot is shown in Figs. 38 and 39. Pivot pin 39 is inserted in the bearing holes in the lever bearing lugs 82 and 83. The ends of these lugs are placed within pockets 48 provided in the member 32 to which the lever is to be pivoted and the pivot pin is firmly secured in contact with 32 by means of the clamp 42 and screw 79 which is tapped into the same. The holes in lugs 82 and 83 swing freely on the fixed pivot pin. This gives the lever a free pivoted movement which is well secured against lateral displacement by means of the widely spaced bearings 82, 83. Fig. 40 shows the clamp 42 separated from the other members. The groove 39' fits the pivot pin closely to properly locate the same, the clamp itself being located by the pins 84, which I prefer to form in one piece with the clamp. Suitable holes are provided in member 32 (see Fig. 39) to engage the pins 84, the position of the clamp being thus controlled, and through it the position of the pin and lever pivot upon it. By my invention I am thus enabled to accurately pivot the lever in a fixed position with a minimum number of parts of low cost.

Figs. 27, 28, 36 and 37 illustrate my improved method of forming the key-cap supporting flange 85 by punching the same more or less completely from sheet metal and in one piece with the body of the lever as indicated in Figs. 27 and 36. After the punching operation, the flange is bent at right angles to the stem or stems as illustrated in Figs. 28 and 37. I prefer to provide the disks with one or more extended points 86 which may be turned inward to render the key-cap flange substantially a complete circle as shown in Fig. 37.

It will be obvious that various modifications in the construction and arrangement of parts may be embodied in the machine as hereinbefore described, without departing from the broad spirit of my invention.

I claim:—

1. In a type-bar action, an oscillating lever, an oscillating type-bar, provided with a radius arm, a swinging link pivotally connected to said lever and the radius arm of said type-bar, a pivot for said lever the axis of which is positioned substantially in the same plane with the pivotal axes of said link in normal position of rest, and a pivot for said type-bar the axis of which is positioned substantially in the same plane with the pivotal axes of said link in printing position of said action.

2. In a typewriting machine, a key-operated lever movable about a pivot, a type-bar and a link pivotally connected to said lever and type-bar, the pivotal axes of said connecting link in its normal position of rest being approximately in line with the pivotal axis of said lever, and in its extreme position away from its normal position of rest, in line with the pivotal axis of said type-bar.

3. In a type-bar action, an oscillating lever, an oscillating type-bar provided with a radius arm, a swinging link pivotally connected to said lever and to the radius arm of said type-bar, a pivot for said lever the axis of which is positioned in the same plane with the pivotal axes of said link in normal position of rest, a pivot for said type-bar the axis of which is positioned approximately in the same plane with the pivotal axes of said link in printing position of said action, a universal bar, and an element pivotally connected with said link and movable thereby into engagement with said universal bar toward the end of the printing movement.

4. In a typewriting machine, an actuating lever movable about a pivot, an actuated lever movable about a pivot, and a link pivotally connected to both of said levers, the pivotal axes of said connecting link in its normal position of rest being approximately in line with the pivotal axis of one of said levers, and in its extreme position away from its normal position of rest, in line with the pivotal axis of the other of said levers.

5. In a machine of the character described, a type-bar pivoted on an axis, a key-lever pivoted on an axis, a connecting link pivotally connected adjacent opposite ends to said levers respectively, the pivotal axis of said key-lever being approximately in the same plane with the pivotal axes of said connecting link in the normal positions of rest of said parts and the pivotal axis of said type-bar being in the same plane with the pivotal axes of said connecting link adjacent the end of the printing stroke of said type-bar.

6. In a type-bar action, a type-bar pivoted on an axis and moving in a plane, a link pivotally connected to said type-bar and moving substantially in said plane, a type-bar actuating lever of the first order angularly displaced relative to said plane with its actuating end pivotally connected with said link and having its fulcrum bearing centrally arranged with respect to a vertical plane extending through the actuated and actuating ends of said lever, the pivot axes of said link and actuating lever being parallel to the pivot axis of said type-bar.

7. In a type-bar action, an oscillating lever, an oscillating type-bar, provided with a radius arm, a swinging link pivotally connected to said lever and the radius arm of said type-bar, a pivot for said lever the axis of which is positioned approximately in the same plane with the pivotal axes of said link in normal position of rest, and a pivot for said type-bar the axis of which is positioned approximately in the same plane with the pivotal axes of said link in printing position of said action, the pivot axes of said lever, type-bar and link being parallel.

8. A three part type-bar action comprising a type-bar pivoted on an axis and moving in a plane, a link pivotally connected to said type-bar and moving substantially in said plane and a key-lever of the first order angularly displaced relative to said plane, the lever arm farthest removed from the key end of said lever being pivotally connected with said link and the fulcrum bearing of said key-lever being arranged substantially central with respect to a vertical plane containing the center of the key and the center of the pivot between said key-lever and link.

9. In a type-bar action, an oscillating lever, an oscillating type-bar provided with a radius arm, a swinging link pivotally connected to said lever and the radius arm of said type-bar, a pivot for said lever, the axis of which is positioned substantially in the same plane with the pivotal axes of said link in normal position of rest, a pivot for said type-bar, the axis of which is positioned substantially in the same plane with the pivotal axes of said link in printing position of said action and yieldable means connected to said link and tending to hold said type-bar in normal position of rest.

10. In a type-bar action, an oscillating lever, an oscillating type-bar provided with a radius arm, a swinging link pivotally connected to said lever and the radius arm of said type-bar, a pivot for said lever, the axis of which is positioned substantially in the same plane with the pivotal axes of said link in normal position of rest, a pivot for said type-bar, the axis of which is positioned substantially in the same plane with the pivotal axes of said link in printing position of said action, a three armed element having one arm pivoted to said link, a yielding means attached to a second arm of said element and exerting tension in a direction approximately perpendicular to the plane containing the pivotal axes of said link in normal position, and a second yieldable means adapted to engage the third arm of said element toward the end of the printing movement, said second yieldable means exerting a tension transversely to the plane of said pivotal axes of the link when said type bar is in printing position, said second yieldable means being adapted to initiate the return movement of said type bar action.

11. In a typewriter, a bank of type-bars operating on pivotal axes angularly disposed with respect to each other and arranged along a curved line, a bank of type-bar operating keys arranged in a series of straight stepped rows, the length of said key rows being short relative to the chord of the angle of the extreme outer units of said bank of type-bars, a bank of type-bar operating levers of the first order to one end of which said keys are attached and to the other end of which said type-bars are operatably connected, pivots for said levers disposed along curved lines, the axis of each of said levers being parallel to the axis of the type-bar to which it is operatably connected, the centers longitudinal of said lever pivots being displaced axially to increasing extents as the ends of said key rows are approached so as to center each lever bearing in the vertical plane including the center of the key and the point where said lever is operatably connected with its respective type-bar.

12. In a typewriter, a bank of type-bars operating on pivotal axes angularly disposed with respect to each other and arranged along a curved line, a bank of type-bar operating keys arranged in a series of straight stepped rows, the length of said key rows being short relative to the chord of the angle of the extreme outer units of said bank of type-bars, a bank of type-bar operating levers of the first order to one end of which said keys are attached and to the other end of which said type-bars are operatably connected, pivotal joints for said levers disposed along curved lines, the axis of each of said levers being parallel to the axis of the type-bar to which it is operatably connected, the centers longitudinal of said lever pivots being displaced axially to increasing extents as the ends of said key rows are approached so as to center each lever bearing in the vertical plane including the center of the key with the point where said lever is operatably connected with its respective type-bar, the arms of each of said actuating levers extending approximately along said vertical plane joining its actuated point with its actuating point.

13. In a machine of the character described, a slotted, closed base bearing block, a type-bar pivoted in said slot, a key-operated lever, a link operatably connecting said type-bar and said lever and adapted to rest on the base wall of said bearing block slot to determine the position of rest of said type-bar and lever, and a yieldable means for normally holding said link against the base wall of said slot.

14. In a machine of the character described, a slotted, closed base bearing block, a type-bar pivoted in said slot, a key-operated lever, a link operatably connecting said type-bar and said lever and adapted to rest on the base wall of said bearing block slot to determine the position of rest of said type-bar and lever, and a yieldable means for normally holding said link against the base wall of said slot, the seating of said link on the base wall of said slot being adapted to sustain said type-bar and lever in approximately normal position independent of the type-bar pivot.

15. In a machine of the character described, a type-bar, a key-lever, a link operatably connecting said type-bar and key-lever, a fixed support upon which said link is adapted to rest for determining the normal position of rest of said type-bar and key-lever, and yieldable means for normally holding said link against said support, said link being provided with a shoe surface on the bottom thereof movable into and out of abutment with said support.

16. In a machine of the character described, a type-bar, a key-lever, a link operatably connecting said type-bar and key-lever, a fixed support upon which said link is adapted to rest for determining the normal position of rest of said type-bar and key-lever, and yieldable means for normally holding said link against said support, said link being provided with a lug or projection adapted to interlock with said support.

17. In a machine of the character described, a type-bar, a key-lever, a link operatably connecting said type-bar and key-lever, a fixed support upon which said link is adapted to rest for determining the normal position of rest of said type-bar and key-lever, and yieldable means for normally holding said link against said support, said link being provided with a lug or projection adapted to interlock with said support, said support being provided with a pocket for the reception of said lug or projection.

18. In a typewriting machine, a bearing block provided with a slot and a pocket in the base wall of said slot, and a link operating in said slot, said link being provided with a lug adapted at times to seat itself in said pocket.

19. In a typewriting machine, a circular bearing block, radial slots in said block, and a circular groove in the continuous base wall of said block communicating with each radial slot to form a pocket in the base wall of each slot.

20. In a typewriting machine, a curved bearing block provided with a plurality of radial transverse bearing slots and having a continuous wall extending longitudinally of said block, said continuous wall constituting the bottom walls of said bearing slots, and a longitudinal groove in said longitudinal wall communicating with said transverse slots.

21. In a typewriting machine, the combination with a bearing block provided with a transverse slot, of a link within said slot, two lever arms normally oscillatably connected to the link within said slot, the connected portions of said lever arms and link having overlapping portions the combined thickness of which is substantially equal to the thickness of either lever arm outside of said overlapping portions.

22. In a typewriting machine, the combination with a bearing block provided with a transverse slot, of a link within said slot, two lever arms normally oscillatably connected to the link within said slot, the connected portions of said lever arms and link having overlapping portions the combined thickness of which is substantially equal to the thickness of either lever arm outside of said overlapping portions, one of said overlapping portions having a pivot and the other of said portions having a pivot bearing.

23. In a typewriting machine, the combination with a bearing block provided with a transverse slot, of a link within said slot, two lever arms normally oscillatably connected to the link within said slot, the connected portions of said lever arms and link having overlapping portions the combined thickness of which is substantially equal to the thickness of either lever arm outside of said overlapping portions, the lateral surfaces of said levers and link being flush with each other.

24. In a typewriting machine, the combination with a bearing block provided with a transverse slot, of a link within said slot, two lever arms normally oscillatably connected to the link within said slot, the connected portions of said lever arms and link having overlapping portions the combined thickness of which is substantially equal to the thickness of either lever arm outside of said overlapping portions, one of said overlapping portions being provided with a lip and the other with a flange interlocking therewith in predetermined relative positions.

25. In a typewriting machine, the combination with a bearing block provided with a transverse slot, of a link within said slot, two lever arms normally oscillatably connected to the link within said slot, the connected portions of said lever arms and link having overlapping portions the combined thickness of which is substantially equal to the thickness of either lever arm outside of said overlapping portions, said lever arms having portions interlocking them against relative lateral displacement for predetermined relative angular positions of said lever arms.

26. In a typewriting machine, the combination with a bearing block provided with a transverse slot, of a link within said slot, a lever oscillatably connected to said link within said slot, the connected portions of said lever and link having overlapping portions the combined thickness of which is substantially equal to the maximum thickness of either of said overlapping elements at points adjacent to said overlapping portions, one of said overlapping portions having a pivot and the other of said portions having a pivot bearing.

27. In a typewriting machine, the combination with a bearing block provided with a transverse slot, of a link within said slot, a lever oscillatably connected to said link, the connected portions of said lever and link having overlapping portions the combined thickness of which is substantially equal to the maximum thickness of either of said overlapping elements at points adjacent to said overlapping portions, one of said overlapping portions having a pivot and the other of said portions having a pivot bearing, and said levers having portions interlocking them against lateral displacement for predetermined relative angular positions of said connected elements.

28. In a typewriting machine, a plate or support, a clamp block provided with doweled connection with said plate or support, a pivot pin interposed between said plate or support and said clamp block, means for securing said clamp block to said plate or support, and a lever pivoted on said pivot.

29. In a typewriting machine, a plate or support, a clamp block provided with doweled connection with said plate or support, a pivot pin interposed between said plate or support and said clamp block, means for securing said clamp block to said plate or support, and a lever pivoted on said pivot, said clamp block being provided with a pin locating slot and dowel pins integral with said clamp block.

30. In a typewriting machine, pivotally connected members normally of the same thickness, one face near the end of one of said members being recessed to leave an integral cylindrical pivot pin whose axis is perpendicular to and supported by a relatively thin wall at the other face of said member, the other of said members being transversely pierced to form a bearing eye and having one face recessed about said eye so that the connected members may be in flush-face relation with each other.

31. In a typewriting machine, pivotally connected members normally of the same thickness, one face near the end of one of said members being recessed to leave an integral cylindrical pivot pin whose axis is perpendicular to and supported by a relatively thin wall at the other face of said member, the other of said members being transversely pierced to form a bearing eye and having one face recessed about said eye so that the connected members may be in flush-face relation with each other, the overlapping portion of one of said members including a lip and the other a flange interlocking therewith in predetermined relative angular positions.

32. In a typewriting machine, pivotally connected members having overlapping portions, one of said portions being provided with a bearing and the other of said portions being provided with a laterally projecting pin journaled in said bearing, one of said overlapping portions being provided with a lug arranged to interlock with the other of said overlapping portions when said portions are in predetermined relative positions, said overlapping portions having their outer surfaces flush with each other.

CHARLES W. BARNABY